UNITED STATES PATENT OFFICE.

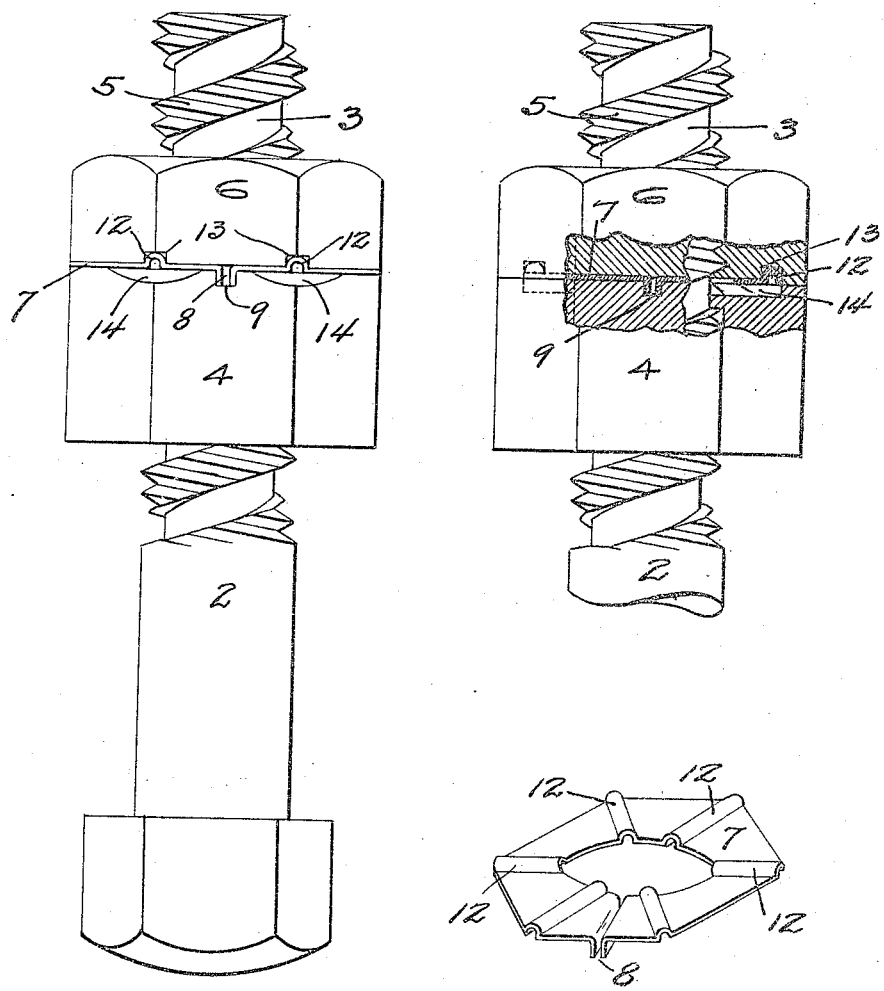

JOSEPH W. DROLL, OF OAKLAND, CALIFORNIA.

NUT-LOCK.

1,244,039.  Specification of Letters Patent.  Patented Oct. 23, 1917.

Application filed November 1, 1916. Serial No. 128,890.

*To all whom it may concern:*

Be it known that I, JOSEPH W. DROLL, a citizen of the United States, and a resident of Oakland, county of Alameda, and State of California, have invented a certain new and useful Nut-Lock, of which the following is a specification.

The invention relates to a nut lock.

An object of the invention is to provide a simple and efficient means for positively locking a nut in set position after it has been threaded upon a bolt.

Another object of the invention is to provide a washer which engages the nut to be locked and the locking nut, the nuts being so constructed to allow the locking nut to be turned into tight locking engagement.

The invention possesses other advantageous features, some of which, with the foregoing, will be set forth at length in the following description where I have outlined in full that form of the invention which I have selected for illustration in the drawings accompanying and forming part of the present specification. Changes in the structure may be made without departing from the invention as set forth in the claims.

Referring to said drawings:

Figure 1 is a view on an enlarged scale of the nut lock of my invention.

Fig. 2 is a view, partly in section, of a modified form of nut lock.

Fig. 3 is a perspective view of the washer.

The nut to be locked in position may be screwed onto any suitable threaded element, such as the bolt 2. The bolt is provided with oppositely inclined threads, one thread to be engaged by each nut. The thread 3 which is engaged by the clamping nut 4 is preferably a right hand square thread, and the nut 4 is correspondingly tapped. The reverse thread 5 which is engaged by the lock nut 6 is a left hand thread and preferably of twice the pitch of the right hand thread 3, that is, it has twice as many threads per inch as the thread 3. By forming the threads of different pitch, each nut has a firm contact with the threads and the clamping nut is in contact with its thread at all parts thereof, so that there is no liability to strip the threads. Further, by making the threads 5 of twice the pitch, the locking nut may be pressed more tightly against the nut 4.

Arranged between the nuts and surrounding the bolt, is a washer 7 of resilient metal. The washer is provided with a tooth or projection 8, formed preferably by the downturned ends of a split washer, which seat in a groove or pocket 9 in the nut 4, thereby preventing rotation of the washer with respect to the nut 4. The washer is provided on its opposite surface with one or more projections 12, preferably radially disposed, which are adapted to lie in similarly disposed grooves or pockets 13 on the face of the locking nut 6. These prevent rotation of the washer with respect to the locking nut and prevent the locking nut from being loosened by vibration, and since the nuts engage reverse threads, prevent the rotation of either nut with respect to the bolt or with respect to each other. To permit the locking nut to be screwed tightly against the washer, the clamping nut 4 is provided on its face with depressions 14 arranged below the projections 12 on the washer, so that the washer can spring downwardly in sections when the projections 12 are in contact with the face of the nut 6 between the grooves or pockets 13.

In Fig. 2, I have shown a modified form of construction for use in instances where appearance is a consideration. In this construction, the pocket 9 does not extend to the side face of the nut 4 and the projections 12 are formed as buttons, instead of being radially disposed. The pockets 13 into which the buttons extend are formed more or less circular in shape and do not extend to the side face of the nut and the depressions 14 also terminate on the upper face of the nut 4 within its periphery. When the lock nut is in place, the washer is hidden, producing a locked nut of attractive appearance.

I claim:

1. In a nut lock, a bolt having reverse threads thereon, a clamping nut and a locking nut engaging said threads, a flexible washer lying between said nuts and having projections thereon adapted to engage in pockets in said nuts, and depressions in the clamping nut below the projections on the washer engaging the locking nut for permitting the flexure of the washer out of engagement with the lock nut.

2. In a nut lock, a bolt having reverse threads thereon, a clamping nut and a locking nut engaging said threads, a washer arranged between said nuts, a projection on said washer engaging a pocket on said clamping nut, a second projection on said washer engaging a pocket on said locking nut and a depression in the clamping nut below said second projection adapted to permit said second projection to be displaced from said locking nut.

3. In a nut lock, a bolt having reverse threads thereon, a clamping nut engaging one of said threads, a locking nut engaging the other of said threads, a seat in the face of said clamping nut, a resilient washer having a projection disposed in said seat whereby rotation of the washer with respect to the clamping nut is prevented, a seat in the face of said locking nut, a projection on said washer adapted to enter said second seat and a depression in the face of the clamping nut into which the washer is adapted to move when said last named projection is moved from its seat by rotation of the clamping nut.

In testimony whereof, I have hereunto set my hand at San Francisco, California, this 24th day of October, 1916.

JOSEPH W. DROLL.

In presence of—
H. G. PROST.

Copies of this patent may be obtained for five cents each, by addressing the "Commissioner of Patents, Washington, D. C."